US008666649B2

United States Patent
Otto et al.

(10) Patent No.: US 8,666,649 B2
(45) Date of Patent: Mar. 4, 2014

(54) SYSTEMS AND METHODS FOR USE IN IDENTIFYING AT LEAST ONE ALTERNATE AIRPORT

(75) Inventors: Willard Kyle Otto, Aurora, CO (US); Jason William Clark, Highlands Ranch, CO (US); Matthew B. Hendrian, Aurora, CO (US); Samantha Ann Schwartz, Castle Rock, CO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/344,413

(22) Filed: Jan. 5, 2012

(65) Prior Publication Data
US 2013/0179059 A1    Jul. 11, 2013

(51) Int. Cl.
*G06F 19/00* (2011.01)
(52) U.S. Cl.
USPC ........................................................ 701/120
(58) Field of Classification Search
USPC ........................................................ 701/120
See application file for complete search history.

(56) References Cited

U.S. PATENT DOCUMENTS

| | | | | |
|---|---|---|---|---|
| 4,706,198 | A * | 11/1987 | Thurman | 701/120 |
| 5,398,186 | A * | 3/1995 | Nakhla | 701/16 |
| 5,526,265 | A * | 6/1996 | Nakhla | 701/16 |
| 6,181,987 | B1 * | 1/2001 | Deker et al. | 701/3 |
| 6,278,965 | B1 | 8/2001 | Glass et al. | |
| 6,473,675 | B2 * | 10/2002 | Sample | 701/3 |
| 6,580,998 | B2 | 6/2003 | Flynn et al. | |
| 6,591,171 | B1 | 7/2003 | Ammar et al. | |
| 6,856,864 | B1 * | 2/2005 | Gibbs et al. | 701/3 |
| 7,065,443 | B2 | 6/2006 | Flynn et al. | |
| 7,415,336 | B1 * | 8/2008 | Burch | 701/468 |
| 7,702,427 | B1 * | 4/2010 | Sridhar et al. | 701/4 |
| 8,005,582 | B2 * | 8/2011 | Boorman et al. | 701/3 |
| 8,014,908 | B2 | 9/2011 | Clarke et al. | |
| 8,193,948 | B1 * | 6/2012 | Shapiro et al. | 340/965 |
| 8,214,136 | B2 * | 7/2012 | Caillaud | 701/120 |
| 8,290,696 | B1 * | 10/2012 | Sridhar et al. | 701/120 |
| 8,301,368 | B1 * | 10/2012 | Masson | 701/400 |
| 2009/0171560 | A1 | 7/2009 | McFerran et al. | |
| 2010/0161153 | A1 | 6/2010 | Corfman | |

FOREIGN PATENT DOCUMENTS

EP      0743580 A1    11/1996
WO      0016230       3/2000

OTHER PUBLICATIONS

International Search and Examination Report; Application No. GB1222446.5; dated Jun. 17, 2013, pp. 6.

* cited by examiner

*Primary Examiner* — Mary Cheung
*Assistant Examiner* — Anne Mazzara
(74) *Attorney, Agent, or Firm* — Armstrong Teasdale LLP

(57) ABSTRACT

Systems and methods for use in identifying at least one alternate airport for an aircraft. One example method includes identifying a plurality of alternate airports based on static data associated with the plurality of alternate airports, identifying, at a processing device, at least one preferred alternate airport from the plurality of alternate airports based on dynamic data associated with the plurality of alternate airports, and storing the at least one preferred alternate airport. The dynamic data includes at least one of visibility information and traffic density information.

20 Claims, 2 Drawing Sheets

SYSTEMS AND METHODS FOR USE IN IDENTIFYING AT LEAST ONE ALTERNATE AIRPORT

BACKGROUND

The field of the disclosure relates generally to systems and methods for use in identifying at least one alternate airport.

Aircrafts generally takeoff with a flight plan to a destination airport, at which the aircraft intends to land. While proceeding toward the destination airport, one or more conditions may arise that disrupt the flight plan and/or require the aircraft to be diverted to another airport. Conditions necessitating diversion of the aircraft often include, among others, weather conditions, aircraft conditions, emergency situations, destination airport conditions, etc. Upon diversion of the aircraft, one or more alternate airports are typically designated based on the location of the alternate airport relative to the position of the aircraft when diverted from the destination airport. Such alternate airports are generally designated by known flight systems. Depending on the condition causing the diversion and the relative location of the aircraft, known flight systems may provide several alternate airports, from which the pilot and/or crew members may ultimately select the alternate airport.

BRIEF DESCRIPTION

In one aspect, a method for use in identifying at least one alternate airport for an aircraft is provided. The method includes identifying a plurality of alternate airports based on static data associated with the plurality of alternate airports, identifying, at a processing device, at least one preferred alternate airport from the plurality of alternate airports based on dynamic data associated with the plurality of alternate airports, and storing the at least one preferred alternate airport. The dynamic data includes at least one of visibility information and traffic density information.

In another aspect, a flight plan system for use in identifying at least one alternate airport for an aircraft is provided. The flight plan system includes a memory device configured to store static data related to a plurality of airports and a processing device coupled to the memory device. The processing device is configured to identify a plurality of alternate airports from the plurality of airports based on the static data, identify at least one preferred alternate airport from the plurality of alternate airports based on dynamic data associated with the plurality of alternate airport, and store the at least one preferred alternate airport in the memory device. The dynamic data includes at least one of visibility information and traffic density information.

In yet another aspect, one or more non-transitory computer-readable storage media having computer-executable instructions embodiments thereon is disclosed. When executed by at least one processing device, the computer-executable instructions cause the at least one processing device to identify a plurality of alternate airports based on static data associated with a plurality of alternate airports, identify multiple preferred alternate airports from the plurality of alternate airports based on dynamic data associated with the plurality of alternate airports, and store the at least one preferred alternate airport in a memory associated with the at least one processing device. The dynamic data includes at least one of visibility information and traffic density information.

The features, functions, and advantages that have been discussed can be achieved independently in various embodiments or may be combined in yet other embodiments further details of which can be seen with reference to the following description and drawings.

DETAILED DESCRIPTION

The subject matter described herein relates generally to systems and methods for use in identifying at least one alternate airport, based on static data and dynamic data associated with one or more potential alternate airports.

In one embodiment, technical effects of the methods, systems, and computer-readable media described herein include at least one of: (a) identifying a plurality of alternate airports based on static data associated with the plurality of alternate airports, (b) identifying at least one preferred alternate airport from the plurality of alternate airports based on dynamic data associated with the plurality of alternate airports, and (c) storing the at least one preferred alternate airport.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
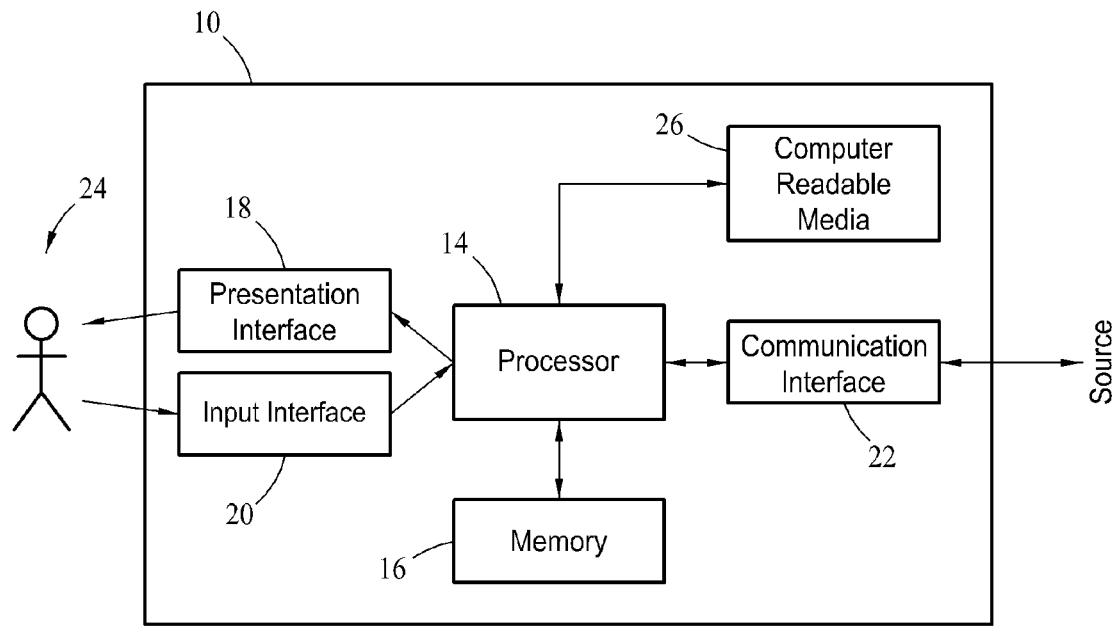
FIG. 1 is a block diagram of an exemplary computing device, that may be included in an electronic flight bag.

FIG. 1 is a block diagram of an exemplary computing device 10. In the exemplary embodiment, computing device 10 includes a memory 16 and a processor 14, e.g., processing device, that is coupled to memory 16, e.g., memory device, for executing programmed instructions. Processor 14 may include one or more processing units (e.g., in a multi-core configuration). Computing device 10 is programmable to perform one or more operations described herein by programming memory 16 and/or processor 14. For example, processor 14 may be programmed by encoding an operation as one or more executable instructions and providing the executable instructions in memory 16.

Processor 14 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 14, cause processor 14 to perform at least a portion of the methods described herein. The above examples are exemplary only, and thus are not intended to limit in any way the definition and/or meaning of the term processor.

Memory 16, as described herein, is one or more devices that enable information such as executable instructions and/or other data to be stored and retrieved. Memory 16 may include one or more computer-readable media, such as, without limitation, dynamic random access memory (DRAM), static random access memory (SRAM), a solid state disk, and/or a hard disk. Memory 16 may be configured to store, without limitation, maintenance event log, diagnostic entries, fault messages, and/or any other type of data suitable for use with the methods and systems described herein.

In the exemplary embodiment, computing device 10 includes a presentation interface 18 that is coupled to processor 14. Presentation interface 18 outputs (e.g., display, print, and/or otherwise output) information such as, but not limited to, installation data, configuration data, test data, error messages, and/or any other type of data to an operator 24. For example, presentation interface 18, e.g., output device, may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 18 includes more than one display device. In addition, or in the alternative, presentation interface 18 may include a printer.

In the exemplary embodiment, computing device 10 includes an input interface 20, e.g., input device, that receives input from operator 24. In the exemplary embodiment, input interface 20 is coupled to processor 14 and may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 18 and as input interface 20.

In the exemplary embodiment, computing device 10 includes a communication interface 22 coupled to memory 16 and/or processor 14. Communication interface 22 is provided to receive various types of data and/or information from one or more sources. Communication interface 22 may be a single device or several devices, each dedicated to one or more different type of communications. In several embodiments, communication interface 22 includes one or more of, without limitation, an aviation radio interface, a GPS interface, a network adapter interface, or other interface suitable to send and/or receive information about an aircraft, the location of the aircraft, weather conditions, and/or information related to other aircraft, etc. With specific reference to weather information, for example, communication interface 22 may be configured to receive METAR information, TAF information, SIGMET information, Weather Watches, PIREPS information, and/or AIRMET information, etc. Additionally, or alternatively, communication interface 22 may be configured to receive air traffic and/or traffic density information, through, for example, ADS-B location information or other similar information, through GRP and/or radar communication. In some embodiments, communication interface 22 may be further configured to receive NOTAM information, airport compliances information, airport minimum equipment list (MEL) information, FAA aircraft situation display (ASD) information, diversion data for one or more aircrafts, and/or other information usable in one or more exemplary methods herein to determine a preferred alternate airport.

Instructions for operating systems and applications are located in a functional form on non-transitory memory 16 for execution by processor 14 to perform one or more of the processes described herein. These instructions in the different embodiments may be embodied on different physical or tangible computer-readable media, such as memory 16 or another memory, such as a computer-readable media 26, which may include, without limitation, a flash drive, CD-ROM, thumb drive, floppy disk, etc. Further, instructions are located in a functional form on non-transitory computer-readable media 26, which may include, without limitation, a flash drive, CD-ROM, thumb drive, floppy disk, etc. Computer-readable media 26 is selectively insertable and/or removable from computing device 10 to permit access and/or execution by processor 14. In one example, computer-readable media 26 includes an optical or magnetic disc that is inserted or placed into a CD/DVD drive or other device associated with memory 16 and/or processor 14. In some instances, computer-readable media 26 may not be removable.

Computing device 10 may be embodied in a variety of different flight plan systems associated with an aircraft and/or an airport for providing, transmitting, and/or displaying alternate airport information to an operator. Specifically, in some embodiments, computing device 10 may be an electronic flight bag (EFB), or a computing system included within an aircraft, such as, for example, aircraft 102 described with reference to FIG. 2. Further, in various embodiments, computing device 10 may be embodied in one or more portable communication devices, such as a smartphone, a tablet, a portable computer (e.g., an iPad), a laptop computer, a personal digital assistant (PDA), etc. In other embodiments, computing device 10 is an operation center workstation and/or server located at one or more airports, which is provided to provide flight plans and/or direction to aircrafts in transit. It should be appreciated that flight plan systems may be provided by one or more combinations of systems and/or device. For example, an EFB may include a processor 14 and memory 16, but utilize presentation interface 18 and/or communication interface 22 of another device/system, such as the aircraft, to provide computing device 10. Moreover, it should be appreciated that flight plan systems described herein may include more or less components that is illustrated in computing device 10 of FIG. 1.

Figure 2:
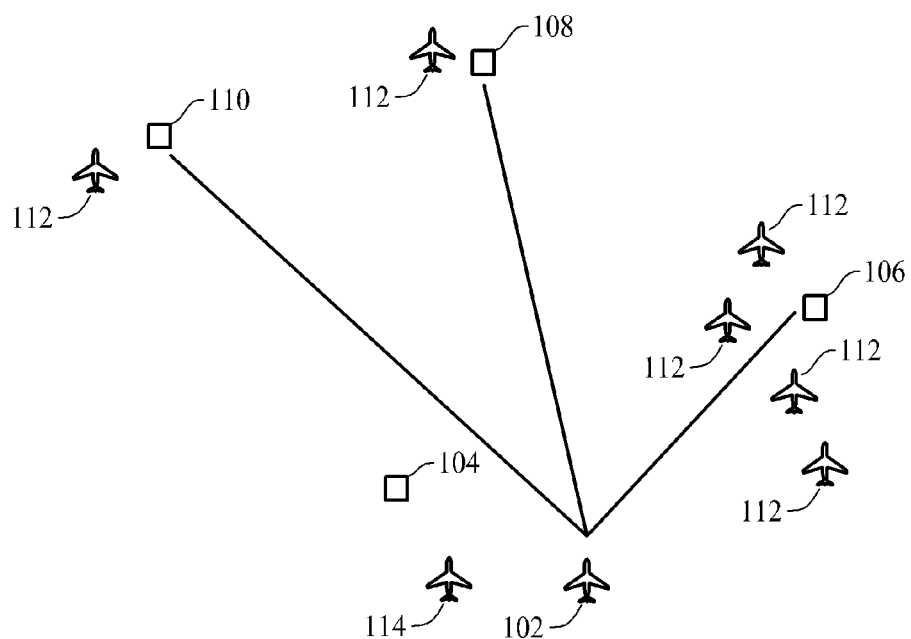
FIG. 2 is an exemplary diagram illustrating relative positions of alternate airports to an aircraft, that may utilize the computing device of FIG. 1.

FIG. 2 illustrates an exemplary diagram of an aircraft 102, which is positioned relative to four airports 104, 106, 108, and 110. Airport 104 is the destination airport for aircraft 102. More specifically, when aircraft 102 departs from its airport of origin (not shown), a flight plan was provided for aircraft 102 to arrive at destination airport 104 at a particular time. In one or more conditions, aircraft 102 may be diverted from destination airport 104. Under such circumstances, alternate airports 106, 108, and 110 (collectively referenced alternate airports 106-110) provide potential landing locations for aircraft 102. FIG. 2 illustrates several aircrafts 112 inbound to and/or in close proximity to alternate airports 106-110. Further, an aircraft 114 is inbound to and/or in close proximity to destination airport 104, and may be similarly diverted to alternate airports 106-110. The methods and system provided herein aid an operator, such as, for example, a pilot, a navigator, a flight control engineer, an air traffic controller, etc., in determining, which of alternate airports 106-110 is preferred and/or a priority over the other alternate airports.

Further, while aircrafts 102, 112 and 114 are illustrated as commercial airplanes in this exemplary embodiment, it should be appreciated that various types of aircrafts may be the subject to and/or associated with the systems and methods described herein.

Figure 3:
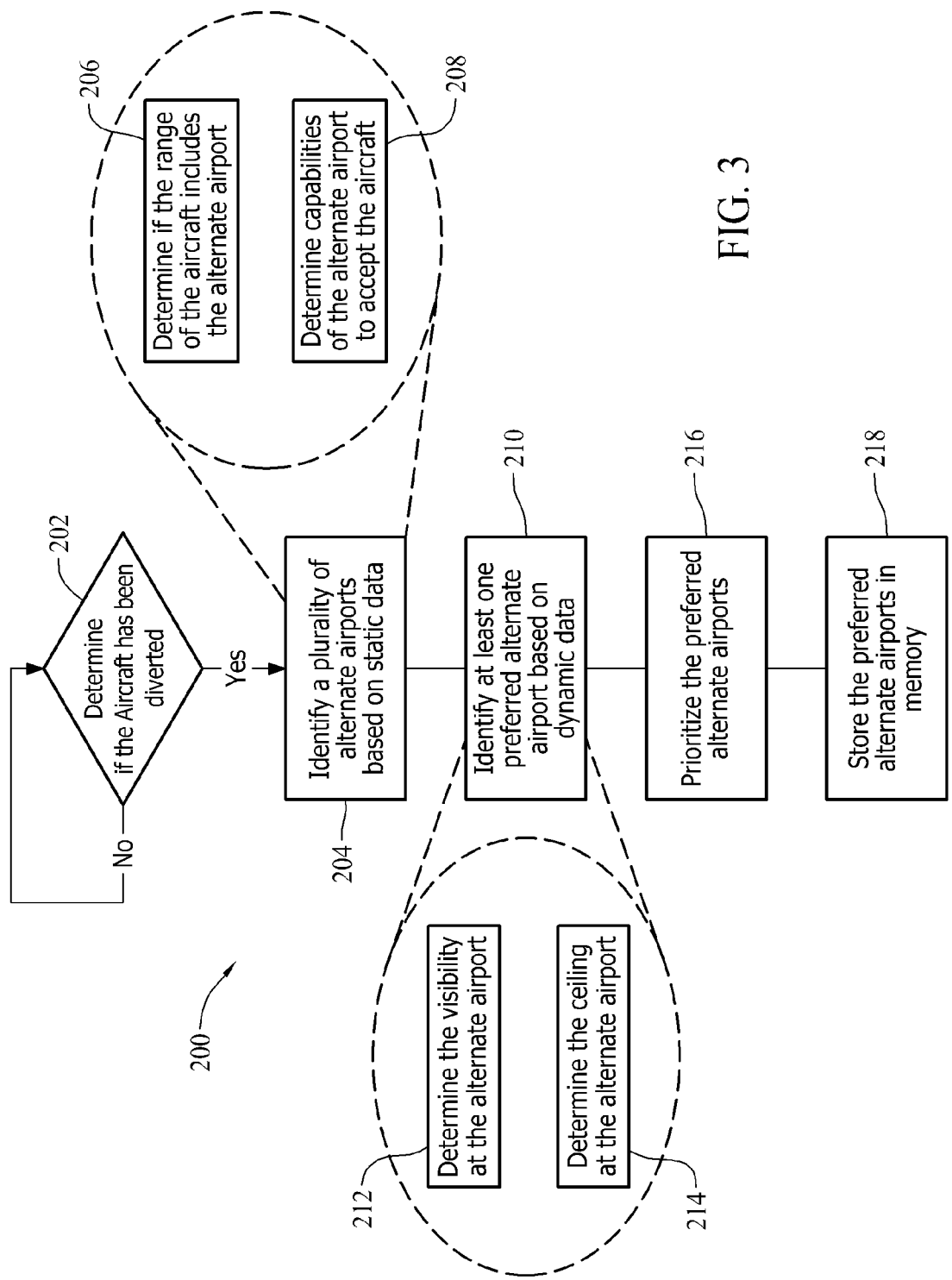
FIG. 3 illustrates a flow diagram of an exemplary method for use in identifying at least one alternate airport.

FIG. 3 illustrates an exemplary method for use in selecting an alternate airport. While method 200 is described with reference to computing device 10 and the diagram of FIG. 2, it should be appreciated that method 200 may be used with a variety of different computing devices, having more or less components, to provide preferred alternate airport(s) under a variety of conditions. Method 200 is therefore not limited to the computing device illustrated in FIG. 1 or the exemplary diagram of aircrafts/airports illustrated in FIG. 2. Similarly, the computing device illustrated in FIG. 1 is not limited to the methods described herein.

In the exemplary embodiment, processor 14 determines if that aircraft 102 has been diverted from destination airport 104 at step 202. Aircraft 102 may be diverted for a number of reasons, including, without limitation, weather condition in route to or at destination airport 104, visibility, non-weather condition at destination airport 104 (e.g., debris on the runway, security incident, runway light operation), traffic at destination airport 104, or other conditions that makes destination airport 104 unavailable to aircraft 102, etc. Processor 14 may determine 202 that aircraft 102 has been diverted based on an input from an operator to input interface 20. In other embodiments, processor 14 may be configured to automatically determine aircraft 102 has been diverted based on communication from an air traffic controller.

Additionally, or alternatively, processor 14 proceeds with method step 204, even when aircraft 102 has not yet been diverted. In this manner, one or more alternate airports may be identified at various points along a flight to destination airport 104, and readily available if needed.

Processor 14 identifies 204 a plurality of alternate airports, such as alternate airports 106-110, to which aircraft 102 may be diverted. The plurality of alternate airports is identified 204 based on static data associated with the plurality of alternate airports 106-110. More specifically, static data associated with the plurality of alternate airports 106-110 includes static data associated with one or more of the plurality of alternate airports. Static data may include, various types of information related to substantially unchanging aspects/condition of an airport. Static data may include, for example, location information for alternate airports 106-110, capacity and/or specifications of alternate airports 106-110 (e.g., runway parameters, light systems, etc.), and/or services at alternate airports 106-110 (e.g., airport rescue coverage and hours, etc.). Static data may further include, for example, city information associated with alternate airports 106-110 (e.g., population, proximate accommodations, mass-transit information, etc.), whether the carrier for aircraft 102 is based and/or provides service at alternate airports 106-110, etc.

As shown in FIG. 3, in the exemplary embodiment, identifying 204 the alternate airports may include determining 206 if the range of aircraft 102 includes alternate airports 106-110. Such determination may be based on the location of alternate airports 106-110, the current position of aircraft 102 from the respect one of alternate airports 106-110, fuel reserves of aircraft 102, calculated fuel burn to alternate airports 106-110, etc. Generally, step 206 is provided to determine, based on static data associated with alternate airports 106-110, if aircraft 102 is capable of reaching alternate airports 106-110. The determination may additionally consider weather conditions along a flight plan, such as wind to calculating fuel burn.

Additionally, identifying 204 the alternate airports may include determining 208 capabilities of alternate airports 106-110 to accept aircraft 102. More specifically, processor 14 may compare one or more minimum requirements for the particular type of aircraft 102 to the capacity, capabilities, and/or specifications of alternate airports 106-110. For example, a runway parameter (e.g., length and width) may be considered to determine 208 if alternate airports 106-110 are able to accept aircraft 102. In another example, capacity of alternate airports 106-110 (e.g., number of gates/stands). In the exemplary embodiment, alternate airports 106-110 are airports to which aircraft 102 is capable of fly to and land at. Further, while only three alternate airports 106-110 are illustrated in FIG. 2, it should be appreciate that any number of alternate airports may be identified as potential landing locations for aircraft 102. In some embodiment, alternate airports 106-110 may additionally be filtered and/or prioritized based on the static data.

As should be appreciated, some aspects of alternate airports 106-110 may be preferred, while other required for one or more different types of aircraft 102. Upon identifying 204 the plurality of alternate airports, processor identifies 210 one or more preferred alternate airports from the alternate airports identified at step 204.

As shown in FIG. 3, processor 14 identifies 210 at least one preferred alternate airport based on dynamic data. The term "dynamic data" as used herein includes aspects/condition of alternate airports 106-110 that are subject to regular and/or frequency change. Dynamic data may include, without limitation, current and forecasted visibility or visibility information at alternate airports 106-110, landing weather minimums at alternate airports 106-110, non-weather conditions at alternate airports 106-110 (e.g., runway conditions, surface conditions of runways, functionality of lighting, etc.), and traffic density at alternate airports 106-110 (i.e., multiple alternative airports). In this manner, the preferred alternate airport provides a more complete evaluation, per aircraft 102, of available alternate airports, as compared to known methods. For example, with reference to FIG. 2, alternate airport 106 is the closest airport to aircraft 102. In known systems, aircraft 102 may be diverted to alternate airport 106, regardless of the traffic density and/or weather conditions at airport 106. By taking into account such data in identifying preferred alternate airports, the embodiments herein provide a situational awareness previously unrealized, which may provide reduced delays, fuel usage, and/or other efficiencies relate to diverting aircraft 102.

Further, in the embodiments herein, accounting for static data and dynamic data may reduce delays associated with an operator in selecting among alternate airports 106-110 within the range of aircraft 102. More specifically, in known systems, pilot and/or navigators select among alternate airports, causing delay through evaluation of information and selecting the alternate airport.

As shown in FIG. 3, in the exemplary embodiment, identifying 210 includes determining 212 the visibility at alternate airports 106-110. Processor 14 may account for current and/or forecasted weather information in determining 212 the visibility. Current visibility information indicates the present and/or more recent information above at alternate airports 106-110 pertaining to visibility, while forecasted information includes the expected visibility condition at an estimated arrival time of aircraft 102 at the respective airport. Further, processor 14 may determine 212 the visibility for all or less than all of alternate airports 106-110. The visibility may be determined 212 based on minimum associated with type of aircraft 102, alternate airports 106-110, and/or an operator of aircraft 102, or other minimum relevant to landing aircraft 102 at one of alternate airports 106-110. It should be appreciated that minimums may be different for different types of aircrafts 102, or alternate airports 106-110.

With reference to FIG. 2, alternate airport 108 is the next proximate airport to aircraft 102. Alternate airport 108 is experience low-visibility, and a forecast for decreased visibility over the next two hours. Because such dynamic data in considered in method 200, processor 14 is able to account for such current and forecasted visibility conditions to identify a preferred alternate airport. Further, alternate airport 110 is further away from aircraft 102, than alternate airports 106 and 108. The current and forecasted visibility and weather are normal, and as shown, the traffic density at alternate airport is less than that of airport 108. Accordingly, in view of such information, processor 14 identifies 204 alternate airport 110 may be identified 210 as a preferred alternate airport. Further, in the exemplary embodiment, processor 14 determines 214 the ceiling at alternate airports 106-110. Similar to determining 212 the visibility, processor 14 may determine the ceiling based on current and/or forecasted conditions, at all or less than all of alternate airports 106-110. The ceiling at one or more of alternate airports 106-110 may be considered relative to one or more minimums.

Dynamic data, such as visibility information and other current and forecasted weather conditions, may be received through communication interface 22, for instance, through aviation radio waves, to processor 14 in various intervals, including periodically, constantly, occasionally, and/or as needed. It should be appreciated that the type of dynamic data used should not be understood to be limited to the embodiments described herein. Dynamic data, for example, may include various types of regularly and/or frequently changing information that may be relevant to identifying preferred alternate airports under various conditions, both at aircraft 102 and at alternate airports 106-110, as well as conditions therebetween.

As shown in FIG. 3, processor 14 proceeds to prioritize 216 alternate airports 106-110 identified at step 204. Prioritizing 216 the preferred alternate airports 106-110 may depend on the number of alternate airports. In an example in which only one preferred alternate airport is provided, prioritizing the alternate airports may be omitted.

In the exemplary embodiment, alternate airports 106-110 are prioritized based on the traffic density at the alternate airports 106-110. Specifically, processor 14 priorities alternate airport 106-110 based on the number of flight destined for a particular alternate airport. Further, traffic density is included to account for aircrafts diverted from other airports, such as aircraft 114 diverted from destination airport 104. Without considering the traffic density, aircraft 102 may be diverted to airport 106, for example, and ultimately entered into a holding pattern, while already scheduled aircrafts 112 are permitted to land. By considering traffic density in prioritizing alternate airports 106-110, processor 14 is able to reduce the potential for additional delay when aircraft 102 reaches one of alternate airport 106-110.

While weather information is generally described herein as a basis for identifying 210 one or more preferred airports, and traffic density is described herein to prioritize such preferred airports, dynamic data may be used otherwise in different embodiments. Specifically, for example, traffic density data may be used in conjunction with weather information (e.g., visibility information) to determine preferred alternate airports. Additionally, or alternatively, visibility information and/or other dynamic information may be used to prioritize identified preferred alternate airports.

Further, as should be appreciated, the different types of data described above may be given various different weights depending on the importance of the particular data. As such, alternate airports may be identified according to different data in different orders in various embodiments.

Upon identified one or more preferred alternate airports, processor 14 stores 218 the preferred alternate airports in memory 16.

When retrieved from memory 16, the preferred alternate airports may be transmitted and/or displayed to an operator. In one example, processor 14 is situated remotely from aircraft 102, such that the preferred alternate airports are transmitted, via communication interface 22, to aircraft 102. In an alternate embodiment, processor 14 is associated with presentation interface 18, such that processor 14 is able to provide the preferred alternate airports for presentation to operator 24 on the flight deck, as presentation interface 18. Regardless of the manner of communication, operator 24 ultimately understands the preferred alternate airports and is able to direct aircraft 102 to one of the preferred alternate airports.

It should be appreciated that one or more aspects of the present disclosure transform a general-purpose computing device into a special-purpose computing device when configured to perform the functions, methods, and/or processes described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for use in identifying at least one alternate airport for an aircraft, said method comprising:

identifying a plurality of alternate airports based on static data associated with the plurality of alternate airports, the static data including at least one of population information, proximate accommodations information, and mass-transit information;

identifying, at a processing device, at least one preferred alternate airport from the plurality of alternate airports based on dynamic data associated with the plurality of alternate airports, the dynamic data including visibility information and traffic density information, wherein at least one of the static data and the dynamic data is associated with at least one weight that enables at least one of the plurality of alternate airports and the at least one preferred alternate airport to be identified based on a relative importance of the at least one of the static data and dynamic data; and storing the at least one preferred alternate airport.

2. The method of claim 1, wherein identifying at least one preferred alternate airport includes identifying multiple preferred alternate airports; and
further comprising prioritizing the multiple preferred alternate airports based on at least the traffic density information.

3. The method of claim 1, further comprising providing the at least one preferred alternate airport for presentation to an operator of the aircraft.

4. The method of claim 1, wherein the static data associated with the plurality of alternate airports includes a runway parameter associated with each of the plurality of alternate airports.

5. The method of claim 1, wherein the dynamic data associated with the plurality of alternate airports includes a runway condition associated with the plurality of alternate airports.

6. The method of claim 1, wherein the dynamic data associated with the plurality of alternate airports includes at least one of a current weather condition and a forecasted weather condition associated with the plurality of alternate airports.

7. The method of claim 1, wherein the dynamic data includes forecasted visibility information associated with the plurality of alternate airports.

8. The method of claim 1, further comprising determining the aircraft has been diverted from a destination airport, prior to identifying the plurality of alternate airports.

9. The method of claim 1, wherein identifying the at least one preferred alternate airports include identifying the at least one preferred alternate airports based on at least one minimum indicated by a type of the aircraft and an operator of the aircraft.

10. The method of claim 1, further comprising receiving the dynamic data associated with the plurality of alternate airports.

11. A flight plan system for use in identifying at least one alternate airport for an aircraft, said flight plan system comprising:
  a memory device configured to store static data related to a plurality of airports; and
  a processing device coupled to said memory device and configured to:
    identify a plurality of alternate airports from the plurality of airports based on the static data, the static data including at least one of population information, proximate accommodations information, and mass-transit information;
    identify at least one preferred alternate airport from the plurality of alternate airports based on dynamic data associated with the plurality of alternate airports, the dynamic data including at least one of visibility information and traffic density information, wherein at least one of the static data and the dynamic data is associated with at least one weight that enables at least one of the plurality of alternate airports and the at least one preferred alternate airport to be identified based on a relative importance of the at least one of the static data and dynamic data; and
    store the at least one preferred alternate airport in said memory device.

12. The flight plan system of claim 11, wherein the static data includes location information for the plurality of alternate airports and the dynamic data includes visibility information and traffic density information.

13. The flight plan system of claim 11, further comprising a communication interface configured to communicate, through aviation radio signals, to receive the dynamic data associated with the plurality of alternate airports.

14. The flight plan system of claim 11, further comprising an input device coupled to said processing device, and wherein said processing device is further configured to receive, via said input device, an input requesting the at least one preferred alternate airport.

15. The flight plan system of claim 11, wherein the flight plan system includes an electronic flight bag.

16. The flight plan system of claim 11, wherein the flight plan system is located within an aircraft.

17. The flight plan system of claim 11, further comprising a display device coupled to said processing device, and wherein said processing device is further configured to display, at said display device, the at least one preferred alternate airport to an operator.

18. The flight plan system of claim 11, wherein the dynamic data includes forecasted visibility information associated with the plurality of alternate airports proximate to estimated arrival time.

19. One or more non-transitory computer-readable storage media having computer-executable instructions embodied thereon, wherein when executed by at least one processing device, said computer-executable instructions cause the at least one processing device to:
  identify a plurality of alternate airports based on static data associated with a plurality of alternate airports, the static data including at least one of population information, proximate accommodations information, and mass-transit information;
  identify multiple preferred alternate airports from the plurality of alternate airports based on dynamic data associated with the plurality of alternate airports, the dynamic data including visibility information and traffic density information, wherein at least one of the static data and the dynamic data is associated with at least one weight that enables at least one of the plurality of alternate airports and the at least one preferred alternate airport to be identified based on a relative importance of the at least one of the static data and dynamic data; and
  store the multiple preferred alternate airports in a memory device associated with the at least one processing device.

20. The non-transitory computer-readable storage media of claim 19, wherein the computer-executable instruction further cause the at least one processing device to prioritize the multiple alternate airports based on at least traffic density information.

* * * * *